US007242945B2

(12) United States Patent
Reddi

(10) Patent No.: US 7,242,945 B2
(45) Date of Patent: Jul. 10, 2007

(54) METHOD, APPARATUS, AND SYSTEM FOR DESIGNING AND PLANNING A SHARED SATELLITE COMMUNICATIONS NETWORK

(75) Inventor: Sasmith Reddi, Centreville, VA (US)

(73) Assignee: iDirect Technologies, Reston, VA (US)

( * ) Notice: Subject to any disclaimer, the term of this patent is extended or adjusted under 35 U.S.C. 154(b) by 94 days.

(21) Appl. No.: 10/879,304

(22) Filed: Jun. 30, 2004

(65) Prior Publication Data

US 2006/0068798 A1    Mar. 30, 2006

(51) Int. Cl.
*H04Q 7/20* (2006.01)
(52) U.S. Cl. .......................... 455/446; 705/7; 709/223
(58) Field of Classification Search ................ 709/315, 709/247, 223; 370/329; 707/503; 715/503; 705/7; 455/446
See application file for complete search history.

(56) References Cited

U.S. PATENT DOCUMENTS

| 6,925,068 | B1 * | 8/2005 | Stanwood et al. | 370/329 |
| 2002/0091871 | A1 * | 7/2002 | Cahill et al. | 709/315 |
| 2002/0169799 | A1 * | 11/2002 | Voshell | 707/503 |
| 2003/0212827 | A1 * | 11/2003 | Saha et al. | 709/247 |
| 2005/0015714 | A1 * | 1/2005 | Cahill et al. | 715/503 |

OTHER PUBLICATIONS

Brochure—OPNET Technologies, Inc.—OPNET Modeler Accelerating Network R&D—WEBSITE—www.opnet.com/products/modeler/opnet-modeler.pdf.
Brochure—OPNET Technologies, Inc.—OPNET SPGuru Intelligent Network Management for Service Providers—WEBSITE—www.opnet.com/products/spguru/SPGuru-brochure.pdf.
Brochure—OPNET Technologies, Inc.—OPNET Wireless Module—WEBSITE—www.opnet.com/products/modules/wireless_module.html.

* cited by examiner

*Primary Examiner*—Jean Gelin
*Assistant Examiner*—Michael T. Vu
(74) *Attorney, Agent, or Firm*—Oblon, Spivak, McClelland, Maier & Neustadt, P.C.

(57) ABSTRACT

A computer-implemented satellite network planning system that enables a user to plan a satellite communications network, using an industry-standard spreadsheet as a platform. The spreadsheet contains embedded equations used to produce a network design that describes components of a physical layer of the planned network (i.e. hub terminals, satellite, and remote terminals), and provides bandwidth allocations and traffic engineering features of the planned network. The spreadsheet includes a user-friendly interface that prompts the user to enter predetermined network parameters but does not display the embedded equations. The result is a user-friendly interface that is familiar enough for most LAN users, designers, and product managers to use and understand the results provided by the network planning system. The use of the industry-standard spreadsheet including the user-friendly interface reduces design time, allows non-technical managers to use the tool, and saves money for the user.

22 Claims, 18 Drawing Sheets

Design Considerations/Requirements:

There are 100 sites with 2 VoIP Lines per site with a usage of 20%.
On the upstream each site has 64,000 bps of which 100 sites have a CIR of 16,000 bps that is oversubscribed 1:1.
The oversubscription ratio used per upstream is 10 with 29 remotes per upstream.
On the downstream each site has 128,000 bps with and oversubscription ratio of 15.

Performance Characteristics:

The Network has a frame length of 124.545 milli-seconds with each upstream having a burstable bandwidth of 337,625 bps, of which 125.13 kbps is reserved for CIR.
150 Remotes Have a non-default min. CIR of 500 bps and 100 Remotes get a default min. CIR of 4,625 bps..

Network Design:

The network has 1 downstream or network with 9 upstreams and each upstream can support 28 remotes.
Based on design requirements the downstream(s) can support an additional 0 remotes and the upstreams can support an additional 11 remotes.

Costs:

The total satellite capacity needed for this network is 7.76 MHz.
At $3,000.00/Month per MHz the total cost of satellite segment is $23,283.13/Month.
The cost per site is $93.13/Month.

FIG. 2A

INPT 4.3 (22 Apr 2004) - IDS 3.2 and Later

Step 1: Enter the Total Sites for Network  
Total Sites  250  NOTE: Only change the cells that have  
Network Type  Voice and Data  a WHITE background Step 2: Enter Voice Lines Per Site & Usage Percentage  
VoIP Lines Per Site  2  
# of Sites with VoIP  100 sites  
Percentage of Voice Use  20 %  Min. Downstream Bandwidth Req.  
BW Per Voice Channel  14,000 bps  for voice only per Outbound  560,000 bps Step 3: Calculate Data Oversubscription Ratio for Upstream  
Bandwidth Per Remote Site  64,000 bps  → Long Term Average Rate (Based on Oversubscription)  
% of Time Upstream BW Used  10 %  
Ratio - Computed Based on Usage  10.0 ◆  → Guaranteed BW/Remote with CIR  16,000 bps  
Select Option To Use  Computed Step 4: Configure Min CIR and CIR on per Remote on Upstream  
Sites with min. CIR other than Default  150 sites  (100 sites with default min. CIR = 4625bps)  
Configured Minimum CIR  500 bps  
CIR Per Site (Incl. Minimum CIR)  16,000 bps  → Committed Information Rate Required Per Site  
Sites with CIR  100 sites

*FIG. 4A*

Step 5: Set Number Of Remotes Per Upstream Based Either on Step 3 or a Manually Select a Number
Remotes/Upstrm - From Share Ratio      29 ◆
Select Option To Use      Computed Step 6: Calculate Oversubscription for Each Downstream
Downstream BW Per Site      128,000 bps    →    In addition to Voice Requirements
CIR Per Site      0 bps
Sites With CIR      0 sites
Downstream Sharing Ratio      15.0    →    Guaranteed BW/Remote w/o CIR      8,533 bps
Total Remotes/Downstream      250
Reserved Multicast Bandwidth      0 bps Step 7: Enter IP Data Rate both Upstream and Downstream

| | Upstream | Downstream | |
|---|---|---|---|
| IP Data Rate | 400,000 | 2,697,312 | (17.8M Outroute in Sept. 04) |
| FEC (Upstream 0.66 or .793) | 0.66 | 0.793 | Max. Upstream (NMII+) is 1,400,000 bps |
| Transmission Rate (bps) | 788,149 | 3,487,681 | |
| Required Bandwidth (Hz) | 492,593 | 2,179,801 | Max. Up - 5,750,000/Max.Down - 23,000,000 |
| | | | Guard Band      1.25 |

Step 8: Frame Length & Dedicated Timeslot Scheduling
Frame Length      124.545 mSecs
Number of TDMA Time Slots      87 Traffic Slots
Bandwidth Per Time Slot (bps)      4.625 SAR Disabled

| STEP 1: ENTER THE TOTAL SITES FOR NETWORK | |
|---|---|
| TOTAL SITES | 250 |
| NETWORK TYPE | VOICE AND DATA |

FIG. 6

| STEP 2: ENTER VOICE LINES PER SITE & USAGE PERCENTAGE | | |
|---|---|---|
| VoIP LINES PER SITE | 2 | |
| # OF SITES WITH VoIP | 100 | SITES |
| PERCENTAGE OF VOICE USE | 20% | |
| BW PER VOICE CHANNEL | 14000 | bps |
| MIN. DOWNSTREAM BANDWIDTH REQ. FOR VOICE ONLY PER OUTBOUND | 560000 | bps |

FIG. 7

| STEP 3: CALCULATE DATA OVERSUBSCRIPTION RATIO FOR UPSTREAM | | |
|---|---|---|
| BANDWIDTH PER REMOTE SITE | 64000 | bps |
| % OF TIME UPSTREAM BW USED | 10% | |
| RATIO-COMPUTED BASED ON USAGE | 10.0 | ◆ → LONG TERM AVERAGE RATE (BASED ON OVERSUBSCRIPTION) |
| SELECT OPTION TO USE ▽ | COMPUTED | → GUARANTEED BW/REMOTE WITH CIR   16000 bps |

FIG. 8

| STEP 4: CONFIGURATE MIN. CIR AND CIR ON PER REMOTE ON UPSTREAM | | |
|---|---|---|
| SITES WITH MIN. CIR OTHER THAN DEFAULT | 150 | SITES · (100 SITES WITH DEFAULT MIN. CIR=4625 bps) |
| CONFIGURED MINIMUM CIR | 500 | Bps · |
| CIR PER SITE (INCL. MINIMUM CIR) | 16000 | Bps → COMMITTED INFORMATION RATE REQUIRED PER SITE |
| SITES WITH CIR | 100 | SITES · |

FIG. 9

| STEP 5: SET NUMBER OF REMOTES PER UPSTREAM BASED EITHER ON STEP 3 OR A MANUALLY SELECT A NUMBER | | |
|---|---|---|
| REMOTES/UPSTRM- FROM SHARE RADIO ▷ | 29 | ◆ |
| SELECT OPTION TO USE | COMPUTED | |

STEP 6: CALCULATE OVERSUBSCRIPTION FOR EACH DOWNSTREAM

| | | |
|---|---|---|
| DOWNSTREAM BW PER SITE | 128,000 | bps |
| CIR PER SITE | 0 | bps • IN ADDITION TO VOICE REQUIREMENTS |
| SITES WITH CIR | 0 | sites • |
| DOWNSTREAM SHARING RATIO | 15.0 | GUARANTEED BW/Remote w/o CIR 8,533 bps |
| TOTAL REMOTES/DOWNSTREAM | 250 | |
| RESERVED MULTICAST BANDWIDTH | 0 | bps |

*FIG. 10*

STEP 7: ENTER IP DATA RATE BOTH UPSTREAM AND DOWNSTREAM

| | UPSTREAM | DOWNSTREAM |
|---|---|---|
| IP DATA RATE | 400,000 | 2,697,312 |
| FEC (UPSTREAM:0.66 OR .793) | 0.66 | 0.793 |
| TRANSMISSION RATE (bps) | 788,149 | 3,487,681 |
| REQUIRED BANDWIDTH (Hz) | 492,593 | 2,179,801 |

| CALC. DOWNSTREAM-BW | (17.8 M OUTROUTE IN SEPT. 04) |
|---|---|

MAX. UPSTREAM (NM II+) IS 1,400,000 bps

MAX. UP - 5,75,000/MAX. DOWN - 23,000,000

| GUARD BAND: | 1.25 |
|---|---|

*FIG. 11*

| STEP 8: FRAME LENGTH & DEDICATED TIMESLOT SCHEDULING | | |
|---|---|---|
| FRAME LENGTH | 124545 | mSecs |
| NUMBER OF TDMA TIME SLOTS | 87 | TRAFFIC SLOTS |
| BANDWIDTH PER TIME SLOT (bps) | 4,625 | SAR Disabled |

NETWORK INFORMATION

| REMOTES/UPSTREAM NETWORK | 28 | (DISTRIBUTED) |
|---|---|---|
| TOTAL UPSTREAMS | 9 | |
| BURSTABLE BW PER UPSTREAM | 337625 | bps |
| TOTAL DOWNSTREAMS | 1 | |
| ADDT. REMOTES SUPPORTED BY DN | 0 | (0 IS BETTER) |
| ADDT. REMOTES SUPPORTED BY UPs | 11 | |

LINK BUDGET INFORMATION

| BW LIMITED Xponder CAPACITY | 6.61 | MHz |
|---|---|---|
| POWER LIMITED-DOWNSTREAM | 0.0 | dB |
| POWER LIMITED-UPSTREAM | 1.0 | dB |
| POWER LIMITED Xponder CAPACITY | 7.76 | MHz |

(NMS AND LINK BUDGET INFO)

| INFORMATION RATE OF EACH IB | 520301 | bps (Incl. all OH) |
|---|---|---|
| INFORMATION RATE OF OB | 2766474 | bps (Incl. all OH) |
| FEC BLOCKS PER FRAME | 82 | |
| | | |
| COST/Mhz | $ 3000 | /MONTH |
| TOTAL COST | $ 23283 | /MONTH |
| COST/SITE | $ 93.13 | /MONTH |

FIG. 18

| STEP 2: ENTER VOICE LINES PER SITE & USAGE PERCENTAGE | | |
|---|---|---|
| VoIP LINES PER SITE | 2 | |
| # OF SITES WITH VoIP | 270 | (INVALID) |
| PERCENTAGE OF VOICE USE | 20% | |
| BW PER VOICE CHANNEL | 14000 | bps |

METHOD, APPARATUS, AND SYSTEM FOR DESIGNING AND PLANNING A SHARED SATELLITE COMMUNICATIONS NETWORK

CROSS REFERENCE TO RELATED APPLICATIONS

The present application contains subject matter related to that disclosed in commonly owned U.S. patent application Ser. No. 10/721,496, entitled METHOD, APPARATUS, AND SYSTEM FOR DOWNSTREAM RECOVERY IN A COMMUNICATIONS NETWORK, filed Nov. 26, 2003.

BACKGROUND OF THE INVENTION

1. Field of the Invention

This invention relates in general to satellite communication networks and in particular to a method, apparatus and system for efficiently designing and planning a shared satellite communications network.

2. Discussion of the Background

Geo-synchronous satellite communication networks have existed for decades in various topologies and using various methods for sharing a fixed bandwidth channel between multiple users (Pritchard, Wilbur L., and Joseph A. Scivlli, *Satellite Communication Systems Engineering*, Prentice-Hall, 1986, incorporated in its entirety herein by reference). As these networks evolved, shared satellite communications networks have gained popularity for their reach, simplicity, cost-effectiveness, and deploy-ability. An example of a conventional shared satellite communications network is shown in FIG. 1. FIG. 1 illustrates a Hub (11) communicating via a satellite (10) with multiple remote terminals (12) as well as the upstream (13) and downstream (14) communication channels. It has been a challenge to deploy a shared network that meets the needs of the end customer, and at the same time meets business goals of a service provider. Most service provider product marketing and analysis personnel are faced with the challenge of not only defining the markets they want to address, but to do so profitably and at the same time meet the customer demand.

Shared satellite services use various algorithms for determining bandwidth on demand and meeting technology idiosyncrasies involved with a specific network being designed. Most network designers have made designs using rough estimations that are laborious and often not re-usable when designing a different shared satellite network with different parameters, capabilities, or technology idiosyncrasies. Computer implemented tools available in the market place include OPNET, but these conventional tools are very expensive and generally require an expert to implement and analyze the results. These tools are based on a custom operating system that is a challenge for new users to master. The cost (financial cost and labor cost) of using such a tool is too expensive for most service providers, especially small service providers where budgets are strictly enforced and Return On Investment (ROI) times are usually short.

As recognized by the present inventor, the industry is in need of a computer-based network designing and planning system with an easily understood interface that an end user can use to perform a low-cost analysis and reliably obtain a final network design.

SUMMARY OF THE INVENTION

Accordingly, one object of this invention is to address the above-identified and other problems with conventional systems and methods for designing and planning a shared satellite communications network.

One aspect of the present invention is that it provides a shared satellite communication network planning system (network planning system) that enables an end user to plan a shared satellite communications network and perform a "what-if" analysis of a planned shared satellite communication network at low cost. The network planning system uses a WINDOWS-based database or spreadsheet (or other industry standard applications that allow for user programmability) as a platform. The use of a database (with programmable calculation features) or spreadsheet as a platform reduces the cost of implementation and overall Information Technology (IT) costs, since most end users already use a database or spreadsheet in their business operations. Furthermore, there is no need for a user to become familiar with an additional operating system, software package, or compiler to use the network planning system.

Another aspect of the present invention is that it provides a user-friendly interface in which an end user enters certain parameters of the envisioned shared satellite communications network. The user-friendly interface is logical enough for most LAN users, designers, and product managers to use and understand the results provided by the network planning system. The user-friendly interface also functions to conceal the complexities of the background formulas used to produce the final network design that is output by the network planning system.

The background formulas used to determine the final network design provided by the network planning system consider network parameters such as the following:

voice parameters (symmetrical traffic);
data parameters on the upstream (communication from the Remote to Hub);
minimum Committed Information Rate (CIR);
dynamic CR oversubscription capability;
upstream oversubscription capability;
data parameters on the downstream (communication from the Hub to Remote);
CIR parameters for both upstream and downstream of all sites or subset of sites;
TDMA overhead based on carrier sizes and framelength chosen;
acquisition timeslot window size;
guard band setting for all carriers;
SAR overhead;
link encryption overhead;
symbol rates
frequency hopping or non-frequency hopping designs; and type of network such as Voice Only, Data Only, Voice Data.

The network planning system outputs a final network design (as an example, the design identifies the number of components needed to meet specified performance requirements) that can be implemented by the user. The network planning system provides a final network design including the information for implementing a physical layer (carrier, etc.), an integrated bandwidth allocation budget analysis that is performed for each site, and traffic engineering features.

In summary, the network planning system provides a user-friendly interface, simple enough for most LAN designers to use, close to accurate results verified with real shared satellite communication networks, an integrated bandwidth allocation budget analysis performed for each site, and integrated traffic engineering features. Further, the network planning system also reduces design time, allows non-technical managers to use the tool, and saves money for the end user.

One example of a satellite system for which the present invention may be used to design is described in U.S. patent application Ser. No. 10/721,496 filed Nov. 26, 2003.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are an exemplary example of a network design including network characteristics and a network diagram provided by the network planning system according to the present invention;

FIGS. 4A and 4B are an exemplary example of a spreadsheet including 8 steps prompting the user to enter the parameters included in the flow chart of FIG. 3;

FIG. 5 is an exemplary user interface for entering data to define the total number of sites within a network plan and the type of network (i.e., Voice Only, Data Only, or Voice and Data);

FIG. 6 is an exemplary user interface for entering data to define a number of voice lines per site; total number of sites that have voice; percentage of time the voice lines are expected to be used per site; and the expected bandwidth per voice call;

FIG. 7 is an exemplary user interface for entering data to specify a long term expected bandwidth per site based on a sharing ratio and an expected usage percentage of an upstream link by each site;

FIG. 8 is an exemplary user interface for entering data to configure the upstream minimum CIR and additional CIR per remote used by the network planning system to plan for a minimum CIR for each remote that is different from the default CIR;

FIG. 9 is an exemplary user interface for entering data to select an option to calculate the number of sites that can be supported automatically by selecting "Computed" from a pull-down menu or manually entering the number of remotes supported per upstream link;

FIG. 10 is an exemplary user interface for entering data to specify the number of downstream links required per site from the user entering information including the long term expected average downstream bandwidth required per site, the expected sharing ratio of the downstream by each site, the desired CIR per remote on the downstream, the number of downstream sites with CIR, and the amount of reserved bandwidth to support multicast traffic on the downstream links;

FIG. 11 is an exemplary user interface for entering data to define the size of carriers in the upstream and downstream links based on IP rates (TDM/TDMA Payload);

FIG. 12 is an exemplary user interface for entering data to enter configurable parameters and informational fields relating to entire network such as if segmentation and reassembly (SAR) is enable or disabled;

FIG. 17 is an exemplary network information section, link budget information section, and cost information section of the network planning system;

FIG. 18 is illustrates an example of an indication showing that an invalid parameter has been entered into the spreadsheet.

DESCRIPTION OF THE PREFERRED EMBODIMENTS

Figure 1:
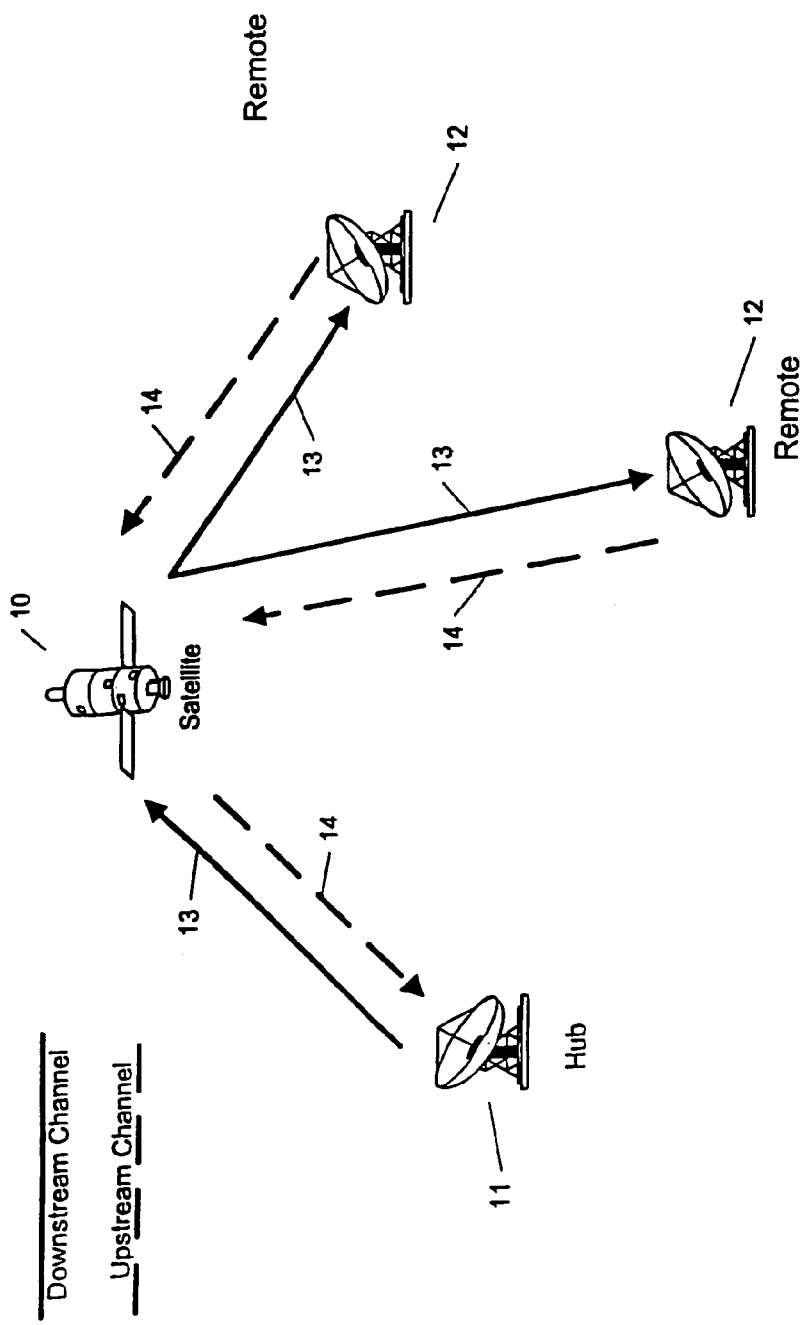
FIG. 1 is a diagram of a conventional satellite communication network.

Referring now to the drawings, one exemplary embodiment of the network planning system uses MICROSOFT EXCEL as a platform (or "operating system") for the tool, although the system could be implemented using another standard spreadsheet or database. MICROSOFT EXCEL is preferred because it is the most popular spreadsheet used in industry and most end users already use a database or spreadsheet in normal business operations and thus are familiar with the interface. By using an industry standard spreadsheet as the interface, the end user need not spend his or her time learning a new operating system (or application), but rather can focus immediately on designing a system. In addition, using a standard platform (e.g., spreadsheet) decreases the "learning curve" associated with operating and understanding the network planning system since the user does not have to learn how to operate a new operating system, software package, or programming language to obtain a final network design. The end user only needs to understand the parameters of the shared satellite communications network he or she wishes to implement and the outputs received, detailing the implementation of the final network design that is produced by the network planning system.

Figure 2B:
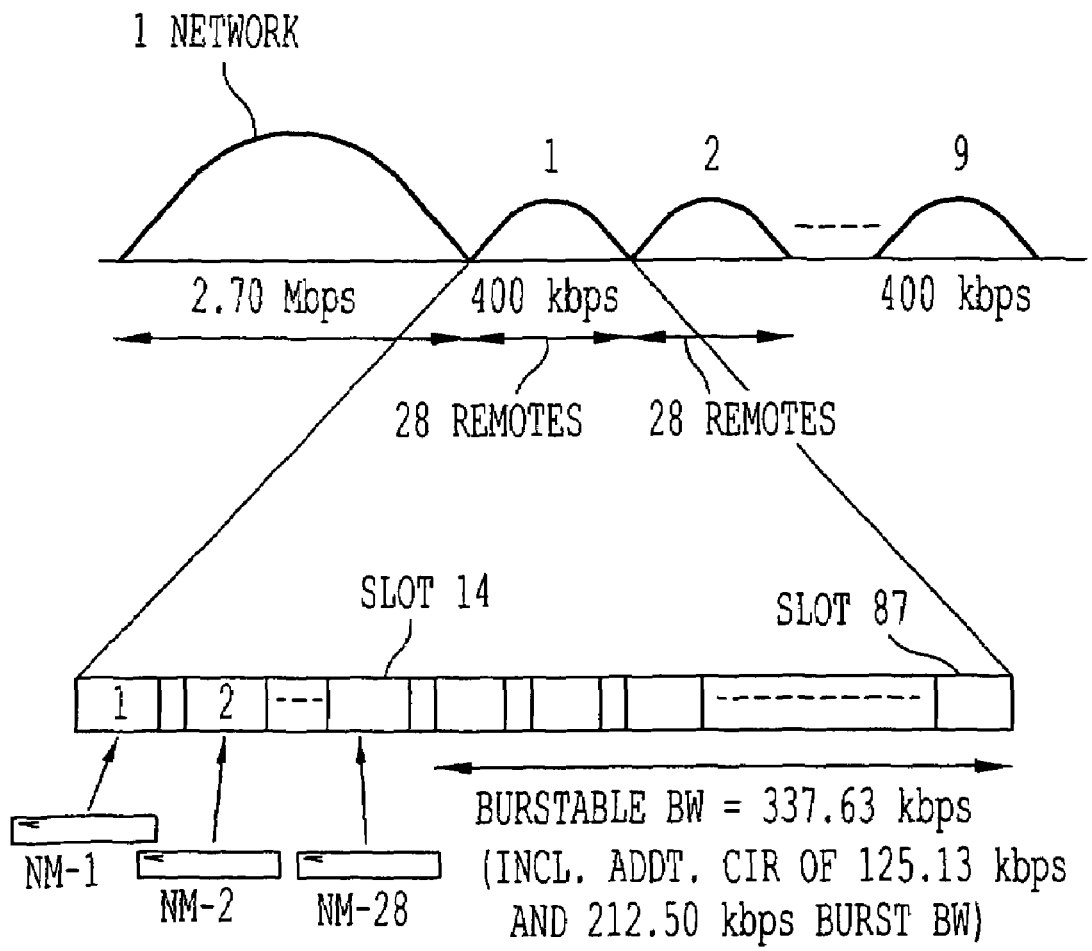

FIGS. 2A and 2B are an exemplary example of a final network design including network characteristics and a network diagram that is produced by the network planning system and will be explained in detail following the explanation of the input network characteristics and parameters that are entered by the user and the calculations performed with the user inputs in producing the outputted final network design.

Figure 3:
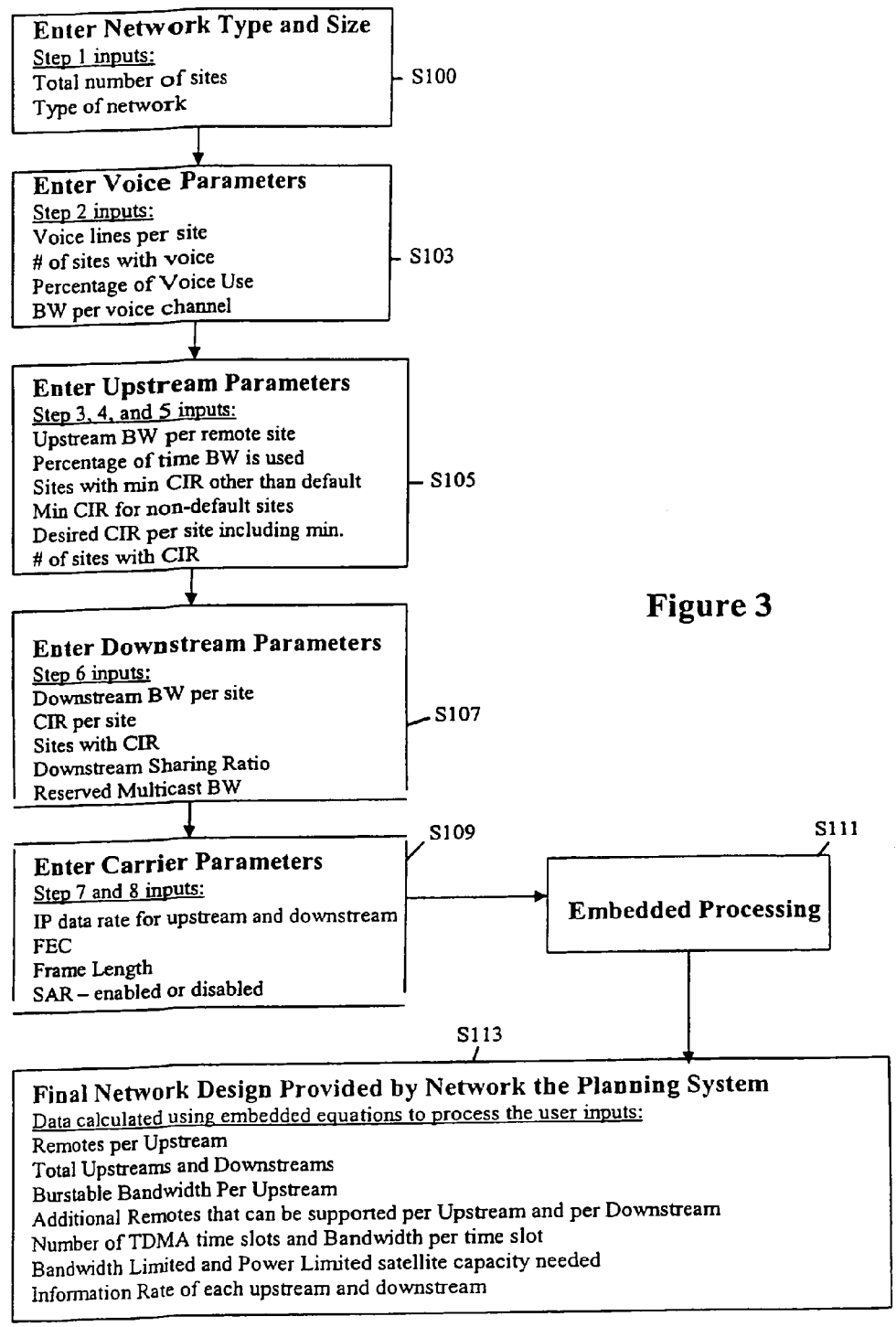
FIG. 3 is a flow chart of the network planning system.

FIG. 3 is a flow chart illustrating the parameters entered by the user in configuring the network that result in a final network design such as the example shown in FIGS. 2A and 2B. In steps S100, S103, S105, S107 and S109, the user is prompted to enter the network type and size, voice parameters if a network type including voice operations is selected, upstream parameters, downstream parameters, and carrier parameters. The entered parameters are then processed in step S111 using embedded calculations (to be discussed in more detail below) within the spreadsheet, and the process proceeds to step S113 where the system provides a final network design based on the entered parameters and underlying equations.

FIGS. 4A and 4B are an exemplary embodiment of a spreadsheet corresponding to the flow chart of FIG. 3 and is used herein to explain the details of the network planning system. It should be noted that the spreadsheet illustrated in FIGS. 4A and 4B includes 8 steps prompting the user to enter network characteristics and parameters. Each of the 8 steps is listed within the appropriate section of the flow chart shown in FIG. 3.

The network planning system provides the user with a way to plan a network based on network characteristics and parameters. The system also provides a simple way to use sharing and overbooking ratios for both data and voice applications, and is designed to calculate bandwidth parameters in both the upstream and downstream direction based primarily on Internet Protocol (IP) data rate parameters. While the first embodiment is based on IP data rates only, it is understood that the network planning system is not limited to only IP data rates and may use other packet-switched or circuit-switched communication protocols. However, most customers' parameters are based in IP throughputs and bandwidth parameters, and therefore the following description is explained in this first embodiment using IP data rates.

Effective network planning involves an iterative process of determining the data rate for the upstream and downstream carriers. The iterative process can be attributed to bandwidth allocation calculations and fine-tuning of carriers based on data parameters and calculations. The network planning system allows the user to easily run several simulations using various possible network parameters to determine a final network design that not only meets the needs of the end customer but also meets the business goal of the user of the network planning system.

This embodiment of the network planning system is explained for simplicity with the following underlying criteria: all calculations are made using IP data rates; sharing and overbooking ratios are based on applications and network parameters; all voice calculations are assumed to be bi-directional and thus are defined only in the upstream links, though the system calculates bandwidth needed in both directions; data bandwidth is in addition to the voice bandwidth parameters; CIR on the downstream or upstream links can be any data rate; CIR bandwidth is a part of voice and data parameters; and the system requires a minimum CIR to be allocated to every remote in the network. The minimum CIR is taken into consideration when the system bandwidth is computed. For explanation in this embodiment, the minimum CIR is one time-slot bandwidth. However, it is to be understood that the minimum bandwidth may adjusted lower allowing for a higher overbooking ratio.

Explanation of User-Input Parameters

As shown in FIG. 5, the user is prompted (for example, a property of a spreadsheet cell is set to be edited by the user) to define the type of network (i.e., Voice Only, Data Only, Voice and Data), and input the total number of sites that are expected within the desired shared satellite communications network. This type of network should be selected based on the desired nature of the network. If a network type is selected including voice operations the user is prompted (in this case the user is free to enter data into an appropriately labeled spreadsheet cell) to enter voice parameters S103 as shown in the flow chart of FIG. 3. More specifically, the network parameters supplied in step 2 are used in Equation (1) (shown below) to calculate the bandwidth reserved to support the voice operations in both the upstream and downstream directions BW_V of the final network design provided by the network planning system. As shown in FIG. 6, the parameters include: the number of voice lines per site Num_Lines; total number of sites that have voice Num_Vsites; percentage of time the voice lines are expected to be used per site Percent_Vusage; and the expected bandwidth per voice call BW_per_V. The expected bandwidth per voice call BW_per_V depends on the Voice Codec used and if cRTP is enabled which compresses the headers and offers significant bandwidth savings.

$$BW\_V = Num\_Lines * Num\_Vsites * Percent\_Vusage * BW\_per\_V \quad (1)$$

As shown in the flow chart of FIG. 3, the user also enters upstream parameters S105. Steps 3, 4, and 5 of the exemplary spreadsheet shown in FIGS. 4A and 4B are used to explain the upstream parameters. As illustrated in FIG. 7, the information entered in step 3 is used to configure the upstream data bandwidth per remote and upstream oversubscription ratio. The oversubscription ratio is the ratio at which bandwidth is shared among multiple sites. For example, 64 Kbps shared at a 10:1 ratio, means that 1 in 10 sites is active at any given period of time. Accordingly, if only 1 site is active the site will receive 64 Kbps of bandwidth satisfying the bandwidth requirements for the user. The parameters entered in step 3 include the long-term expected bandwidth per site based on the oversubscription ratio and the expected usage percentage of an upstream link by each site. The expected usage percentage of an upstream link Upstream_Expected_Usage_Percentage for each site can be used to calculate the oversubscription ratio of an upstream link UR using Equation (2), or alternatively, the user can simply enter the oversubscription ratio directly. The oversubscription ratio is selected based on many factors that include the type of application being used, type of service offered, and customers using the network.

$$UR = 1/Upstream\_Expected\_Usage\_Percentage \quad (2)$$

Step 4, as illustrated in FIG. 8, configures the upstream link's minimum CIR and additional CIR per remote. The CIR is the bandwidth guaranteed for each remote site regardless of the presence of traffic. The parameters shown in FIG. 8 are used in conjunction with each other to plan for a minimum CIR for each remote that is different from the default CIR. In step 4 the user defines how many of the total sites need a minimum CIR that is different from the default, and the minimum bandwidth required by the sites with a minimum CIR different from the default. The advantage of this feature is that it allows the user to select a lower CIR, which allows for more burstable bandwidth or a higher oversubscription ratio. In step 4 the user also enters the desired CIR for each remote per upstream and the total number of sites with this desired CIR. Further, the user can implement dynamic CIR by using a CIR oversubscription ratio.

Step 5, as shown in FIG. 9, determines the number of sites that can be supported within one upstream link. The upstream link is discussed in more detail later and is defined by the user when entering the carrier parameters S109 as shown in the flow chart of FIG. 3. In step 5, the user may select "Manual" and enter the number of remotes supported by each upstream link directly, or alternatively, by selecting "Computed" the network planning system calculates the number of sites supported within one upstream link using Equations (3), (4), and (5).

The number of remotes supported per upstream link will depend on the usable IP throughput per upstream carrier, the amount of bandwidth that is needed for the minimum CIR per site, static CIR bandwidth per CIR site, and the oversubscription ratio for the upstream link. In Equation (3) the reserved minimum bandwidth for each remote for the upstream link Res_min is calculated in the embedded processing block S111 of FIG. 3 using the following user-input parameters: the total number of sites TS; the number of sites with a non-default CIR UminS; the minimum bandwidth for the sites with the non-default CIR Umin; and the bandwidth per time slot BWTslot which is explained in detail later and is calculated using Equation (11). The reserved CIR bandwidth for each remote on the upstream link Res_Up_BW is calculated by processing the number of sites with CIR on the upstream link Usites, the total number of sites TS, and the upstream oversubscription ratio UR. Equation (3) calculates the number of remotes supported on the upstream link Rem_per_U by processing the upstream IP data rate for each upstream carrier Usize, the upstream data bandwidth for each site Up_BW, the upstream oversubscription ratio UR, reserved minimum bandwidth for each remote of the upstream link Res_min, the reserved CIR bandwidth for each remote on the upstream link Res_Up_BW.

$$Res\_min = (TS-UminS)/TS*BWTslot + (UminS/TS*BWTslot)/Umin \quad (3)$$

$$Res\_Up\_BW = Usites/TS*UR \quad (4)$$

$$Rem\_per\_U = Usize/(Up\_BW*UR + Res\_min + Res\_Up\_BW) \quad (5)$$

Step 6 corresponds to the Enter Downstream Parameters block S107 shown in the flow chart of FIG. 3. More specifically, step 6 as shown in FIG. 10 is used to prompt the user to enter the parameters necessary per site on the downstream link. The number of downstream links supported is based on the downstream size defined by the user when entering the carrier parameters S109 shown FIG. 3 and discussed in greater detail later. In step 6 the user enters the following parameters: the long term expected average downstream bandwidth required per site Res_DBW; the expected oversubscription ratio of the downstream for each site DR; the desired CIR per remote on the downstream D_BW; the number of downstream sites with CIR Dsites; and the amount of reserved bandwidth to support multicast traffic of the downstream M_BW. The above parameters are used in Equations (6) and (7) to determine the number of remotes supported per downstream link.

$$Res\_D\_BW = Dsites/TS*DR \quad (6)$$

$$Rem\_per\_D = (Dsize-M\_BW)/(D\_BW*1/DR + Res\_D\_BW + BW\_V) \quad (7)$$

As shown in FIG. 3, the user is also prompted to enter the carrier parameters S109 of the desired satellite network. The carrier parameters are defined in steps 7 and 8 in the exemplary spreadsheet FIGS. 4A and 4B. As illustrated in FIGS. 4B and 11, step 7 is used to define the size of the carriers in the upstream and downstream links based on the IP rates (TDM/TDMA Payload). In step 7 the user enters the upstream IP data rate IP_Data_Rate and downstream IP data rate D_IP_Data_Rate. Alternatively, the user may choose to only enter the upstream IP data rate IP_Data_Rate and have the network planning system calculate the necessary downstream IP data rate based on the upstream IP data rate and parameters entered during steps 1-7 of the exemplary spreadsheet shown in FIGS. 4A and 4B. The upstream carrier value is generally dictated by the antenna and Bus Unit Controller (BUC) size parameters. The user is also prompted to select an upstream FEC option and downstream FEC option FEC bits. The FEC options are used in the embedded equations to calculate the carrier bandwidths and time slot specific bandwidths. The upstream and downstream FEC options provide greater system flexibility and network optimization. Further, the user is directed to select a guard band used to calculate the required bandwidth for the upstream and downstream links RBW shown in FIG. 11. It should be noted that this embodiment of the present invention assumes a bandwidth-limited requirement only. Conversely, if there is a Power Equivalent Bandwidth required, the user should ensure the correct amount of bandwidth is acquired. The information entered by the user in step 7 is used in Equations (8), (9), and (10) to determine the transmission rates Tran_Rate and required bandwidth RBW illustrated in FIG. 11. The transmission rate Tran_Rate calculated by the network planning system includes all bits needed in a carrier. This embodiment of the network planning system is Quadrative Phase-Shift Keying QPSK_Modulation, therefore the transmission rate calculated is twice that of the symbol rate. It should be noted that the TDMA_and_LayerTwo_Overhead consists of variables such as demand information, encryption information, and packet assembly and disassembly used by the network planning system.

$$Info\_Rate = TDMA\_and\_LayerTwo\_Overhead + IP\_Data\_Rate \quad (8)$$

$$Tran\_Rate = FEC \text{ bits} + Info\_Rate \quad (9)$$

$$RBW = Trans\_Rate*CSpacing/QPSK\_Modulation \quad (10)$$

As shown in FIG. 12, step 8 prompts the user to enter the frame length Frame_Length for a network. For a given network, the frame-length is defined by the downstream link and is fixed for all upstream links. When the size of the downstream is set, the network planning system of this embodiment calculates available frame lengths, which can then be chosen from a dropdown list. For most networks the frame length Frame_Length is set to approximately 125 milli-seconds. The parameters entered in step 8 are used to calculate how many time slots are available in each upstream link and the bandwidth available for each time slot BWTslot. Further, in step 8 the user is prompted to select if Segmentation and Re-assembly (SAR) is enable or disabled. If SAR is enabled, there is an additional overhead in each time slot. This decreases the bandwidth per time slot BWTslot. Since the calculations are based on IP data rate parameters Payload_Capacity_TS in this embodiment, the total slots will increase to accommodate the reduction in bandwidth per time slot BWTslot.

$$BWTslot = (Payload\_Capacity\_TS*100/Frame\_Length) \quad (11)$$

Final Network Diagrams Output by Network Planning System

Figure 13:
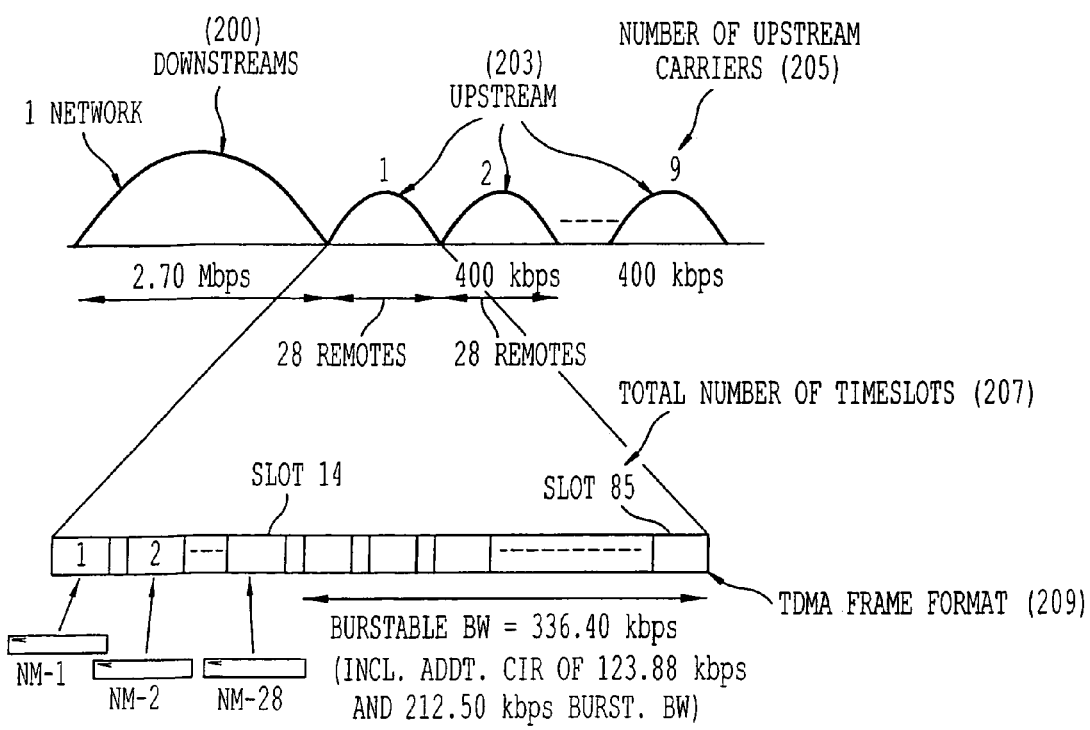
FIG. 13 illustrates an example of a final network diagram provided by the network planning system.
Figure 14:
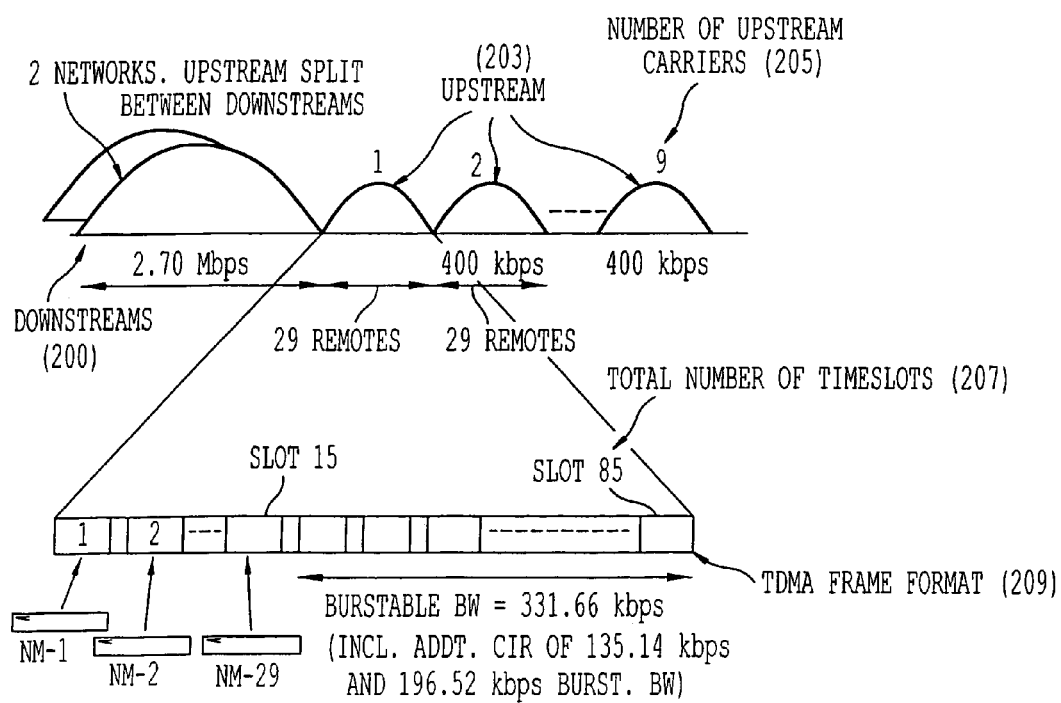
FIG. 14 illustrates another example of a final network diagram provided by the network planning system.
Figure 15:
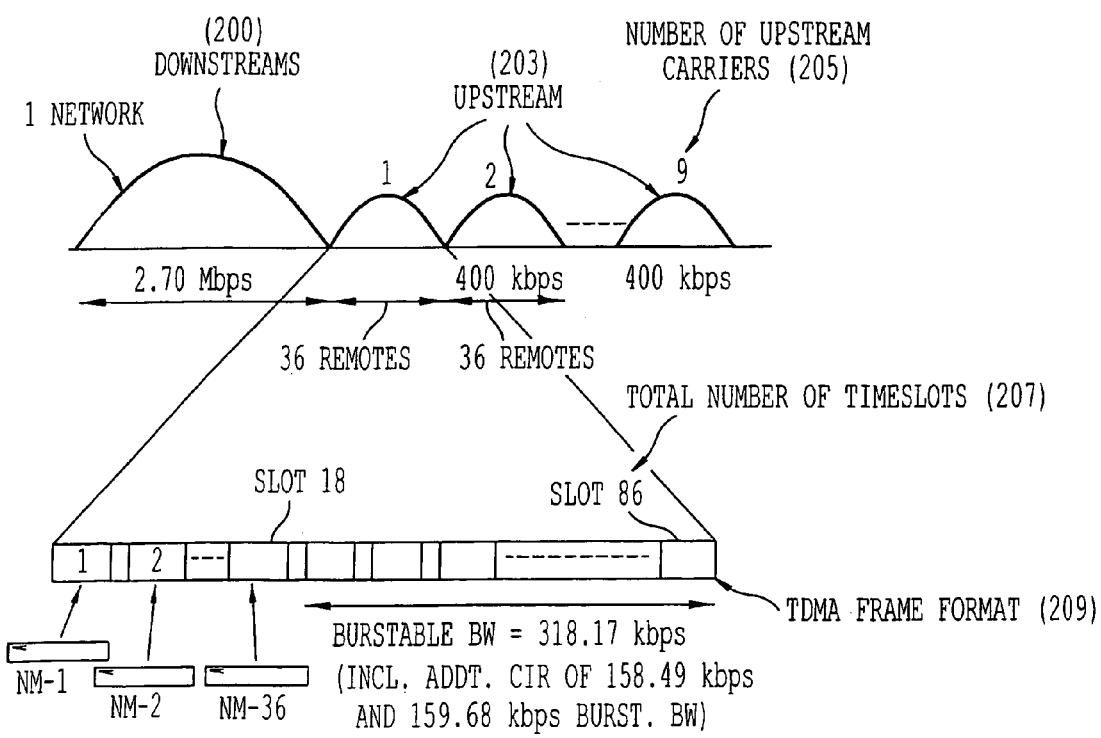
FIG. 15 illustrates a third example of a final network diagram provided by the network planning system.

FIGS. 13, 14, and 15 are variants of an example illustration of the Final Network Diagrams provided based on the network parameters entered in steps 1-8 of this embodiment. The downstream links 200 are shown as the number of networks (large carriers). If the number of networks is greater than 1 (meaning that multiple downstream links are required to support the desired number of upstream links), then multiple downstream carriers are displayed overlapping each other as shown in FIG. 14. Also, if the number of networks is greater than 1, then the upstream links 203 have to be split between all the downstream links 200. The upstream links 203 are shown as multiple carriers. (the smaller carriers) The total number of upstream carriers 205 is displayed above the smaller carriers as shown in FIGS. 13-15. For example, there are 9 upstream carriers in FIG. 13. Since all upstream carriers are assumed to be of the same size, only one of the carriers TDMA frame format 209 is shown. The TDMA frame format is displayed in a number of time-slots. The total number of timeslots 207 is shown towards the right and above the TDMA frame format 209. In FIG. 13, there are 85 time slots. The remotes in the final network design are distributed among all upstream carriers. In the example of FIG. 13, each carrier holds 28 remotes. In FIG. 13, the number of remotes a carrier holds is displayed under the carriers and below the TDMA Frame format 209.

Embedded Calculations

Figure 16:
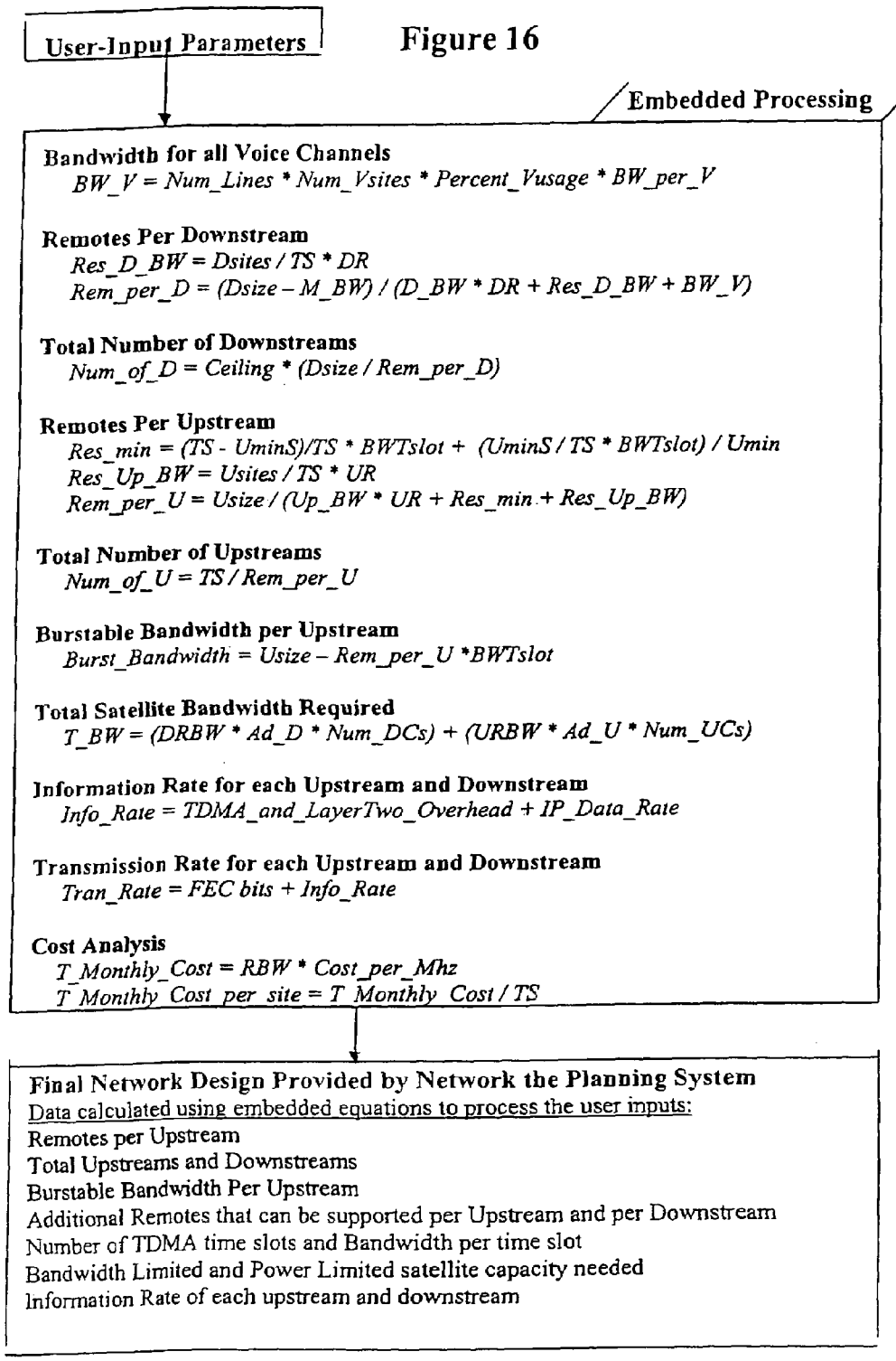
FIG. 16 is an expanded view of the embedded processing block of the flow chart in FIG. 3.

The parameters entered by the user are processed in the Embedded Processing block shown in FIG. 3. FIG. 16 is an expanded flow chart illustrating the equations providing the information displayed in FIG. 17.

The network information section illustrated in FIG. 17 provides the final network design information used for implementing a physical layer of the desired satellite network system. This information includes: the total number of remotes per upstream Rem_per_U calculated using equations (12), (13), and (14); the total number of upstream links Num_of_U calculated using Equation (15); the total number of downstream links Num_of_D calculated using Equation (16) that includes a Ceiling variable embedded within the spreadsheet; the burstable bandwidth per upstream link Burst_Bandwidth calculated using Equation (17); and any additional remotes that can be supported by the downstream links; and any additional remotes that can be supported by the upstream links.

$$Res\_min = (TS-UminS)/TS*BWTslot+(UminS/TS*BWTslot)/Umin \quad (12)$$

$$Res\_Up\_BW = Usites/TS*UR \quad (13)$$

$$Rem\_per\_U = Usize/(Up\_BW*UR+Res\_min+Res\_Up\_BW) \quad (14)$$

$$Num\_of\_U = TS/Rem\_per\_U \quad (15)$$

$$Num\_of\_D = Ceiling*(Dsize/Rem\_per\_D) \quad (16)$$

$$Burst\_Bandwidth = Usize-Rem\_per\_U*BWTslot \quad (17)$$

The remotes per upstream communication channel are distributed among all upstream links that are needed to fulfill the parameters. In the example illustrated in FIG. 13, each upstream link can support 28 remotes. This means that one would need at least 9 upstream links to support a total number of 250 sites. If there are 9 upstream links, then the tool attempts to distribute the remotes equally among all the upstream links.

The value of "Additional Remotes Supported By Downstream" indicates whether or not the downstream carrier has been sized appropriately based on the voice, upstream, downstream, and carrier parameters entered by the user. If this value is greater than 0, then the size of the downstream carrier can be reduced, thus decreasing the overall bandwidth required. If the downstream links could support additional sites, this indicates the downstream IP data rate could be reduced and still support the user-entered parameters. This allows the user to fine tune a desired network.

The value of "Additional Remotes Support By Upstreams" indicates whether or not the upstream carriers have been sized appropriately, based on the voice, upstream, downstream, and carrier parameters entered by the user. Similarly, if this value is greater than 0, then the size of the upstream carriers can be reduced, thus decreasing the overall bandwidth required. In this example, each upstream carrier can support 29 remotes with 400 kbps. Since there are 250 sites, then the minimum number of carriers is 9. Thus the upstream links could support a total of 261 sites, which means 11 more sites could be supported by the upstream links. Therefore, the designer can reduce the size of the upstream carriers to match the total number of sites and bandwidth required. A value of 0, indicates a properly sized carrier according to the voice, upstream, downstream, and carrier parameters entered by the user.

The NMS and Link Budget Information section illustrated in FIG. 17 displays the amount of required bandwith on the satellite for all upstream and downstream carriers. This information is based on a bandwith-limited requirement. If desired satellite network has a power equivalent bandwith requirement, the user can also enter the additional power required for either the downstream of the upstream communication channels. The amount of bandwith required T_BW is calculated using Equation (16).

$$T\_BW = (DRBW*Ad\_D*Num\_DCs)+(URBW*Ad\_U*Num\_UCs) \quad (18)$$

FIG. 17 also illustrates a cost analysis section provided in this embodiment of the network planning system. The total network planning system calculates the total monthly cost per Mhz of bandwidth T_Monthly_Cost and the total monthly cost per site T_Monthly_Cost_per_site of the final network design provided by the network planning system using Equations (15) and (16). This information is calculated from an estimate of the monthly cost of bandwidth Cost_per_Mhz that is entered by the user.

$$T\_Monthly\_Cost = RBW*Cost\_per\_Mhz \quad (19)$$

$$T\_Monthly\_Cost\_per\_site = T\_Monthly\_Cost/TS \quad (20)$$

The first embodiment of the network planning system also indicates to the user when invalid parameters are entered into the spreadsheet. This further simplifies the network planning process. When an invalid parameter is entered, the user is notified by an indicator displayed next to the invalid input as shown in FIG. 18. For example, this embodiment indicates that the number of voice sites should be less than the number of total sites.

The first embodiment of the network planning system also provides the user a worksheet that displays all information in text format for input into proposals or for handouts.

Further, a conversion tool is included in this first embodiment that provides a worksheet that can be used to determine IP rates from either "Information Rate," "Transmission Rate," or "Required Bandwidth."

Computer and System

This invention may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 19:
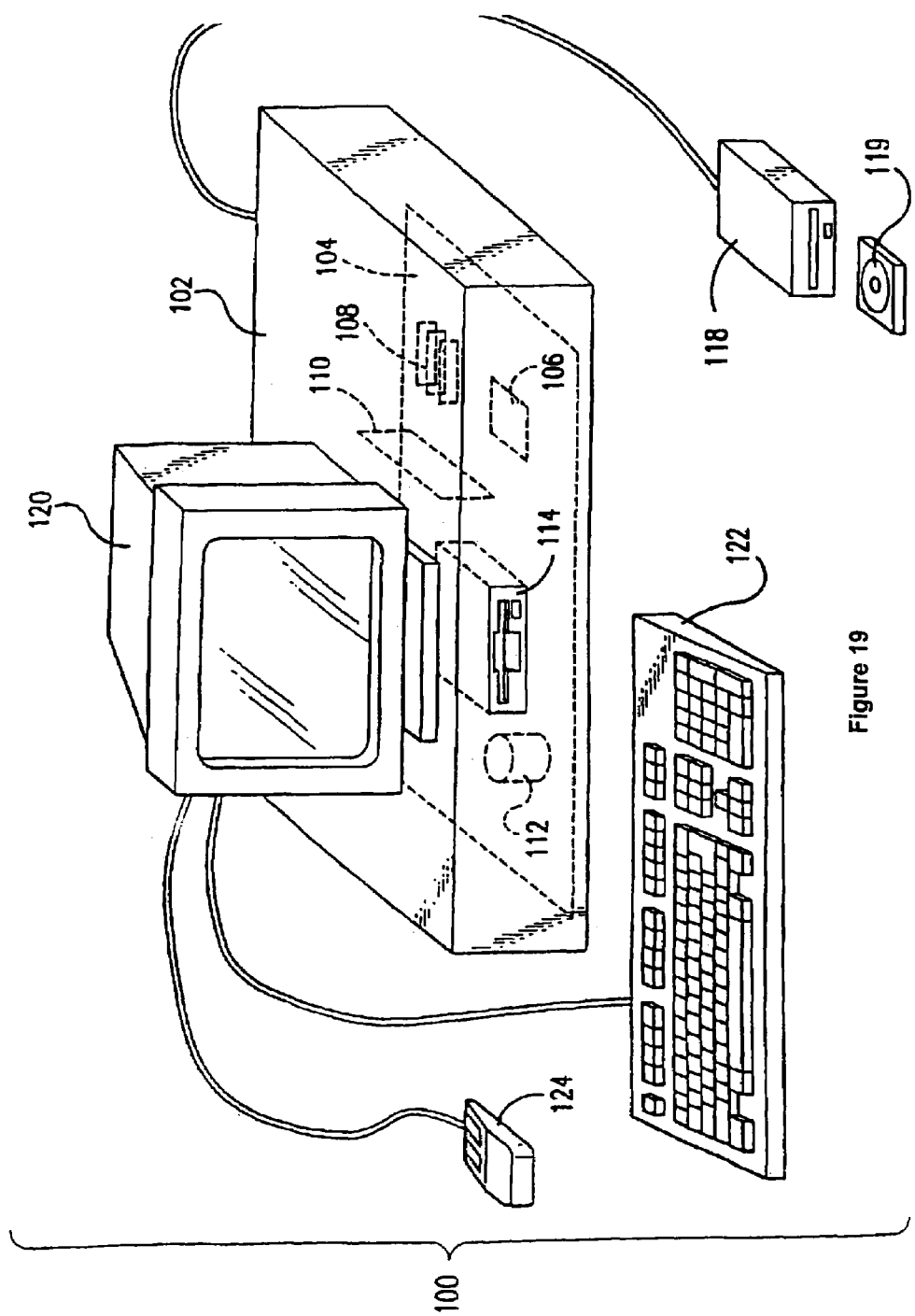
FIG. 19 is a block diagram of a computer that may be used to implement the network planning system.

A computer 100 as shown in FIG. 19 may implement the systems, methods and computer program product of the present invention, wherein the computer housing 102 houses a motherboard 104 which contains a CPU 106, memory 108 (e.g., DRAM, ROM, EPROM, EEPROM, SRAM, SDRAM, and Flash RAM), and other optical special purpose logic devices (e.g., ASICS) or configurable logic devices (e.g., GAL and reprogrammable FPGA). The computer 100 also includes plural input devices, (e.g., keyboard 122 and mouse 124), and a display card 110 for controlling a monitor 120. Additionally, the computer 100 may include a floppy disk drive 114; other removable media devices (e.g. compact disc 119, tape, and removable magneto-optical media (not shown)); and a hard disk 112 or other fixed high density media drives, connected using an appropriate device bus (e.g., a SCSI bus, an Enhanced IDE bus, or an Ultra DMA bus). The computer may also include a compact disc reader 118, a compact disc reader/writer unit (not shown), or a compact disc jukebox (not shown), which may be connected to the same device bus or to another device bus.

As stated above, the system includes at least one computer readable medium. Examples of computer readable media are compact discs 119, hard disks 112, floppy disks, tape, magneto-optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer 100 and for enabling the computer to interact with a human user. Such software may include, but is not limited to, device drivers, operating systems and user applications, such as development tools. Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs. Moreover, parts of the processing of the present invention may be distributed for better performance, reliability, and/or cost. For example, plural contingencies can be calculated in parallel to determine portions of the uncertain costs simultaneously and the results summed at the end.

The invention may also be implemented by the preparation of application specific integrated circuits or by interconnecting an appropriate network of conventional component circuits, as will be readily apparent to those skilled in the art.

Numerous modifications and variations of the present invention are possible in light of the above teachings. It is therefore to be understood that within the scope of the appended claims, the invention may be practiced otherwise than as specifically described herein.

The invention claimed is:

1. A computer-implemented satellite network planning system comprising:
   a spreadsheet configured to contain embedded satellite network planning equations and receive data that is used as input for the embedded equations, said spreadsheet being an application that runs on an industry-standard operating system, said spreadsheet including a user interface configured to prompt a user to enter the data as predetermined satellite network parameters but not display the embedded equations;
   a processor configured to execute the embedded equations using the data input via the user interface and to determine
      a final satellite network design that includes at least one hub terminal, at least one satellite, and at least one remote terminal,
      a total number of upstream carriers, downstream carriers and an information rate for each upstream carrier and downstream carrier,
      performance characteristics of the final satellite network including a frame length of each upstream carrier and an oversubscription of each downstream carrier, and to determine the transmission rate and a bandwidth for the upstream and downstream carriers for the final satellite network design, the transmission rate including bits needed in a carrier and being calculated based on Quadrative Phase-Shift Keying (QPSK) modulation, and demand information, encryption information, and packet assembly and disassembly data being used to further analyze the upstream and the bandwidth available for each time slot, and
      a cost per month for using a satellite network according to the final satellite network design; and
   a display mechanism configured to display the final satellite network design with both text and graphics, said graphics including an image of a spectral occupancy of the downstream carriers.

2. The computer-implemented satellite network planning system according to claim 1, wherein the industry-standard operating system is a MICROSOFT WINDOWS operating system and the spreadsheet is a MICROSOFT EXCEL spreadsheet.

3. The computer-implemented satellite network planning system according to claim 1, wherein the final network design further includes bandwidth allocations calculated from an integrated bandwidth allocation budget analysis performed for each remote terminal and hub terminal.

4. The computer-implemented satellite network planning system according to claim 3, wherein the integrated bandwidth allocation budget analysis includes information rates for upstream links and downstream links as well as FEC Blocks for configuring a frame length for the satellite network.

5. The computer-implemented satellite network planning system according to claim 4, wherein the integrated bandwidth allocation budget analysis further includes bandwidth-limited satellite capacity information for upstream and downstream links based on a bandwidth-limited parameter entered by the user.

6. The computer-implemented satellite network planning system according to claim 5, wherein the integrated bandwidth allocation budget analysis is configured to account for an additional power equivalent bandwidth parameter entered by the user and provides additional power-limited satellite capacity information for the upstream and downstream links of the satellite network.

7. The computer-implemented satellite network planning system according to claim 3, wherein the bandwidth allocation budget analysis determines the total cost per month and the cost per site per month based on a cost per bandwidth per month entered by the user.

8. The computer-implemented satellite network planning system according to claim 1, wherein, the predetermined network parameters include: total number of sites for the network; type of network; upstream and downstream bandwidth per remote site; upstream minimum CIR for each site; downstream CIR for each site; downstream number of sites with CIR; downstream oversubscription ratio; downstream bandwidth reserved for Multicast information; upstream and downstream IP data rate; upstream and downstream FEC; guard band for the network; and Frame Length for the network.

9. The computer-implemented satellite network planning system according to claim 8, wherein the user interface is configured to prompt the user to enter a network format, said format being one of at least Voice Only, Data Only, and Voice and Data.

10. The computer-implemented satellite network planning system according to claim 9, wherein when the network format input by the user is at least one of Voice Only and Voice and Data, the user interface is configured to prompt the user to enter a number of voice lines per site, a number of sites with voice, a voice usage percentage, and a bandwidth per voice channel.

11. The computer-implemented satellite network planning system according to claim 9, wherein the user interface is configured to at least one of prompt the user to enter an oversubscription upstream ratio manually, and select the processor to compute the upstream ratio automatically.

12. The computer-implemented satellite network planning system according to claim 11, wherein when the processor is selected to compute, the user is prompted to enter a percentage of time the upstream bandwidth is used, which is then used in combination with an expected usage percentage of an upstream link to automatically compute the oversubscription upstream ratio.

13. The computer-implemented satellite network planning system according to claim 1, wherein the processor is configured to automatically check at least one of the network parameters entered by the user for validity.

14. The computer-implemented satellite network planning system according to claim 1 further comprising:
a summary unit configured to provide a summary of the final network design in a displayed text format.

15. The computer-implemented satellite network planning system according to claim 1 further comprising:
a conversion tool configured to determine IP data rates from at least one of an information rate, transmission rate, and required bandwidth.

16. A method for planning a satellite network comprising steps of:
embedding satellite network planning equations in a spreadsheet application operating on an industry-standard operating system;
prompting a user to enter data as predetermined satellite network parameters via the spreadsheet;
receiving the data as input to the satellite network planning equations;
processing the input using the satellite network planning equations;
determining a final satellite network design that includes at least one hub terminal, at least one satellite, and at least one remote terminal;
determining a total number of upstream carriers and downstream carriers and an information rate for each upstream carrier and downstream carrier;
determining performance characteristics of the final satellite network design including a frame length of each upstream and an oversubscription of each downstream and determining the transmission rate and a bandwidth for the upstream and downstream carriers for the final satellite network design, the transmission rate including bits needed in a carrier and being calculated based on Quadrative Phase-Shift Keying (QPSK) modulation, and demand information, encryption information, and packet assembly and disassembly data being used to further analyze the upstream and the bandwidth available for each time slot;
determining a cost per month for using the final satellite network design;
displaying the final satellite network design;
displaying the performance characteristics of the final satellite network design; and
displaying the cost split as a total cost per month of the final satellite network and a cost per month of each site of the final satellite network.

17. The method for planning a satellite network according to claim 16, wherein the industry-standard operating system is a MICIROSOFT WINDOWS operating system and the spreadsheet is a MICIROSOFT EXCEL spreadsheet.

18. The method for planning a satellite network according to claim 16, wherein processing the input comprises:
performing a bandwidth allocation budget analysis based on the input for each remote terminal and hub terminal that provides information rates for upstream links and downstream links, FEC blocks for configuring a frame length for the satellite network, and bandwidth-limited satellite capacity information for upstream and downstream links.

19. The method for planning a satellite network according to claim 18, wherein processing the input further comprises:
accounting for an additional power-limited parameter input and providing additional power-limited satellite capacity information for the upstream and downstream links of the satellite network.

20. The method for planning a satellite network according to claim 16, wherein processing the input comprises:
determining the cost per month and cost per site per month based on a cost per bandwidth per month input.

21. The method for planning a satellite network according to claim 16, wherein prompting the user to enter data via the spreadsheet comprises:
prompting the user to enter the total number of sites for the network, network format, upstream and downstream bandwidth per remote site, upstream minimum CIR for each site, downstream CIR for each site, downstream number of sites with CIR, downstream oversubscription ratio, downstream bandwidth reserved for multicast information, upstream and downstream IP data rate, upstream and downstream FEC, guard band for the network, and frame length for the network.

22. A computer program product storing program instructions for execution on a computer system, which when executed by the computer system configures the computer system to operate as a computer-implemented satellite network planning system comprising:
a spreadsheet configured to contain embedded satellite network planning equations and receive data that is used as input for the embedded equations, said spreadsheet being an application that runs on an industry-standard operating system, said spreadsheet including a user interface configured to prompt a user to enter the data as predetermined satellite network parameters but not display the embedded equations;
a processor configured to execute the embedded equations using the data input via the user interface and to determine
a final satellite network design that includes at least one hub terminal, at least one satellite, and at least one remote terminal,
a total number of upstream carriers and downstream carriers and an information rate for each upstream carrier and downstream carrier,
performance characteristics of the final satellite network including a frame length of each upstream carrier and an oversubscription of each downstream carrier, and to determine the transmission rate and a bandwidth for the upstream and downstream carriers for the final satellite network design, the transmission rate including bits needed in a carrier and being calculated based on Ouadrative Phase-Shift Keying (QPSK) modulation, and demand information, encryption information, and packet assembly and disassembly data being used to further analyze the upstream and the bandwidth available for each time slot, and a cost per month for using the final satellite network; and a display mechanism configured to display the final satellite network deign with both text and graphics, said graphics including an image of a spectral occupancy of the downstream carriers.

* * * * *